United States Patent
Woestmann (10) Patent No.: US 9,504,938 B2
(45) Date of Patent: Nov. 29, 2016

(54) FILTERING DEVICE FOR HIGH-VISCOSITY FLUIDS

(75) Inventor: Stefan Woestmann, Fuechtorf (DE)

(73) Assignee: NORDSON HOLDINGS S.A.R.L. & CO. KG, Erkrath (DE)

(*) Notice: Subject to any disclaimer, the term of this patent is extended or adjusted under 35 U.S.C. 154(b) by 539 days.

(21) Appl. No.: 14/004,986

(22) PCT Filed: Mar. 13, 2012

(86) PCT No.: PCT/DE2012/100065
§ 371 (c)(1),
(2), (4) Date: Jul. 28, 2014

(87) PCT Pub. No.: WO2012/122979
PCT Pub. Date: Sep. 20, 2012

(65) Prior Publication Data
US 2014/0332460 A1    Nov. 13, 2014

(30) Foreign Application Priority Data
Mar. 14, 2011    (DE) .................. 10 2011 001 262

(51) Int. Cl.
*B01D 29/66* (2006.01)
*B29C 47/08* (2006.01)
(Continued)

(52) U.S. Cl.
CPC ............. *B01D 29/665* (2013.01); *B01D 29/01* (2013.01); *B01D 29/52* (2013.01);
(Continued)

(58) Field of Classification Search
CPC .... B01D 29/665; B01D 29/01; B01D 29/52; B29C 47/009; B29C 47/0815; B29C 47/0886; B29C 47/362; B29C 47/705
USPC ........ 210/393, 407, 409, 411, 412; 425/197, 425/199
See application file for complete search history.

(56) References Cited

U.S. PATENT DOCUMENTS 5,308,484 A * 5/1994 Bacher .................. B01D 29/05
                                                           210/232
5,417,856 A    5/1995 Bacher et al.
(Continued)

FOREIGN PATENT DOCUMENTS

CN    1756642 A    4/2006
CN    101700443 A   5/2010
(Continued)

OTHER PUBLICATIONS

Written Opinion of the International Searching Authority for International Patent Application No. PCT/DE2012/100065, mailed Sep. 6, 2012, 14 pages.
(Continued)

*Primary Examiner* — Fred Prince
(74) *Attorney, Agent, or Firm* — Baker & Hostetler LLP (57) ABSTRACT

A filtering device (100) for high-viscosity fluids has a partial channel (34) in the housing (30) and a displacing piston (40) which can be inserted into the partial channel (34, 35). The displacing piston (40) has at least one inner fluid line (42) that extends from an inlet opening (41) therein to an outlet opening (43) on its circumference. The outer diameter of the displacing piston (40) corresponds to the inside diameter of the partial channel (34, 35). The displacing piston (40) can be positioned, in a production position, with its outlet opening (43) in front of the inlet of the discharge channel (33) into the partial channel (34, 35) and can be retracted to a backflushing initial position within the partial channel (34). Along a backflushing travel path of the displacing piston, the inlet of the discharge channel (33) into the partial channel (35) is covered by the outer wall of the displacing piston (40) and/or the outlet opening (43) of the displacing piston (40) is covered by the inner wall of the partial channel (34).

18 Claims, 8 Drawing Sheets

(51) Int. Cl.
*B29C 47/70* (2006.01)
*B01D 29/01* (2006.01)
*B01D 29/52* (2006.01)
*B29C 47/36* (2006.01)
B29C 47/00 (2006.01)

(52) U.S. Cl.
CPC ...... *B29C 47/0815* (2013.01); *B29C 47/0886* (2013.01); *B29C 47/362* (2013.01); *B29C 47/702* (2013.01); *B29C 47/705* (2013.01); B29C 47/0009 (2013.01)

(56) References Cited

U.S. PATENT DOCUMENTS

| | | | |
|---|---|---|---|
| 6,216,880 | B1 | 4/2001 | Previero |
| 6,325,217 | B1* | 12/2001 | Hehenberger ......... B01D 35/12 210/341 |
| 6,422,852 | B1 | 7/2002 | Kreyenborg et al. |
| 7,530,463 | B2 | 5/2009 | Bacher et al. |
| 8,153,012 | B2 | 4/2012 | Woestmann et al. |
| 2003/0080470 | A1 | 5/2003 | Zellerohr |
| 2006/0157402 | A1* | 7/2006 | Bacher .................. B01D 29/05 210/333.01 |
| 2007/0209980 | A1* | 9/2007 | Wostmann ............ B01D 29/01 210/109 |
| 2008/0283460 | A1* | 11/2008 | Woestmann .......... B29C 47/681 210/347 |
| 2011/0017681 | A1* | 1/2011 | Bibey ................ B29C 47/0016 210/791 |

FOREIGN PATENT DOCUMENTS

| | | |
|---|---|---|
| CN | 101721847 A | 6/2010 |
| DE | 10151496 A1 | 12/2002 |
| DE | 10149429 A1 | 4/2003 |
| DE | 20300445 U1 | 4/2003 |
| DE | 202009011114 U1 | 12/2010 |
| EP | 0554237 A1 | 1/1993 |
| EP | 0976525 A1 | 2/2000 |
| EP | 1778379 A1 | 5/2007 |
| JP | 2002513694 A | 5/2002 |
| JP | 2005041015 A | 2/2005 |
| WO | 9216351 A1 | 10/1992 |
| WO | 2008104863 A2 | 9/2008 |

OTHER PUBLICATIONS

International Preliminary Report on Patentability for International Patent Application No. PCT/DE2012/100065, mailed Sep. 17, 2013, 16 pages.

Japanese Application No. 2013-558305: Office Action dated Feb. 28, 2015, 2 pages.

* cited by examiner

FILTERING DEVICE FOR HIGH-VISCOSITY FLUIDS

BACKGROUND OF THE INVENTION

The invention relates to a filtering device for high-viscosity fluids.

Filtering devices designed as so-called "screen piston changers" are known for filtering high-viscosity media such as plastic melts in particular. In the design known from EP 1 778 379 B1, for example, two piston-like screen carrier elements are arranged movably in a housing. Each of these screen carrier elements has at least one screen location where a screen space is formed. At least one filter element is placed in each screen space. Feed channels in the housing branch off towards the screen spaces such that melt is guided through the respective filter elements into the screen spaces. Provided behind the filter element, when viewed in the direction of flow, are partial channels through which the plastic melt is discharged. The partial channels are combined at some point at or in the housing or in a joint discharge channel that runs out of the housing.

The known filtering device also allows for backwashing of the filter elements by moving one respective screen carrier element out of the production position such that fluid or melt no longer arrives at the dirt side of the screen. Melt is guided from the rear side, the so-called clean side, into the screen space and from the rear side through the filter element. Particles or agglomerates adhering to the filter element on the dirt side can be loosened from the filter element through the backwash procedure.

In the device disclosed in EP 1 778 379 B1, the basic principle of a backwashable screen piston changer is improved such that displacing pistons are provided for each partial channel that leads away from a screen location and where said displacing pistons can dip into the partial channels on the clean side. A blockage of the discharge channel is effected at the moment when the displacing pistons are inserted into the partial channels. Melt that is present in the partial channel is thus no longer pressed into the discharge channel and therefore into the subsequent unit but exclusively into the screen location provided for backwashing. The displacing piston pushes the fluid located in the partial channel in the flow direction opposite to the one during production operation into the screen space and from behind through the filter element in order to loosen build-up on said filter element.

The advantage of the additional displacing piston is that filtering in the respective other screen carrier element and/or at the other screen locations is completely unaffected by the backwash procedure. While traditional backwash screen piston changers always had to divert a portion of the fluid from the production operation is order to carry out the backwash, the displacing pistons allow for decoupling of the pressure and of the fluid amount required for the backwash from the production process. The only connection between the screen locations on the dirt side is the joining point of the partial channels on the dirt side or the discharge channels that lead from both screen locations to a joint emptying point at the housing. By the fact that the displacing piston blocks this discharge channel during backwash, the connection to the respective other flow path is interrupted as well. There is no pressure loss in the production strand during the backwash.

Thus, the known filtering device with the displacing piston has proven itself. However, a disadvantage is that a larger fluid volume must be kept available in the area between the screen location and the displacing piston, in order to perform later on an effective backwash using the displacing piston. An enlarged diameter must therefore be provided in the partial channel in order to keep a larger volume temporarily available for the given size and thus the limited length of the partial channel. This change in the flow channel geometry on the discharge side in turn leads to reduced flow velocities and thus to longer residence times of the fluid amount present in the partial channel, which may lead to the risk of thermally induced changes during the filtration of the plastic melt in connection with the heated housing, for example.

SUMMARY OF THE INVENTION

The objective of the present invention is to improve a filtering device of the type described above such that during the production operation zones with longer residence times of the fluid are significantly reduced or avoided entirely.

This objective, as well as other objectives which will become apparent from the discussion that follows, are achieved, in accordance with the present invention, by providing a filtering device wherein:

the displacing piston has at least one inner fluid line that extends from an inlet opening in the piston to an outlet opening on its circumference;

the outer diameter of the displacing piston corresponds, at least in some sections, to the inner diameter of the partial channel;

in a production position, the displacing piston can be positioned with its outlet opening in front of the inlet of the discharge channel into the partial channel; and the displacing piston can be retracted into a backwash starting position for storing fluid inside the partial channel whereby, along a backwash travel path of the displacing piston, the inlet of the discharge channel into the partial channel is covered by the outer wall of the displacing piston and/or the outlet opening of the displacing piston is covered by the inner wall of the partial channel.

By the fact that the displacing piston has an inner fluid line, the fluid can be guided through the displacing piston during the production operation. The production position of the displacing piston or its face side, respectively, can therefore correspond to its end position during the backwash, i.e., the position at the end of the stroke by which the fluid is guided from the clean side into the screen space.

Thus, there is no or only a very short partial channel open behind the screen space in some preferred embodiments. Instead, the fluid emerging from the screen space runs directly into the inner fluid line of the displacing piston. In other words, no fluid reservoir is held available during the production operation for the later backwash time. Rather, it is only built and filled shortly before the backwash. Fluid residence times in an area with an increased diameter are therefore limited to a few seconds.

Furthermore, during the backwash the face side of the displacing piston scrapes at best across a very short length of the partial channel wall, which is in contact with fluid during production.

According to the invention, the fluid reservoir volume is increased significantly in all embodiments in that the partial channel is expanded in a partial linear section into which the displacing piston is inserted. In this manner, a large portion of fluid can be stored temporarily for backwash purposes with a retraction motion of the displacing piston. Preferably the production position of the displacing piston and its travel path during backwash are coordinated such that none of the positions during backwash go beyond the position in the production situation. In other words: During backwash, the face side of the displacing piston never reaches a position at the wall of the partial channel that is not covered by the displacing piston in the production position. Thus, during production no part of the inner wall of the partial channel is exposed that would be contacted in any form by the displacing piston later during backwash.

During the production operation, the displacing piston fully fills the respective expanded area with the result of a continuous flow path through the inside of the displacing piston without diameter jumps.

A basic prerequisite for the design according to the invention is an effective seal between the displacing piston and the wall of the partial channel such that no leakage flows can enter into the gap between the displacing piston and the wall of the bore hole in the housing that form the partial channels.

Additionally, the filtering device according to the invention can guide the face side of the displacing piston during production directly to the screen carrier element such that there is absolutely no longer a longitudinal section of the partial channel that would be exposed during production.

If the screen carrier element is formed in the shape of a cylindrical bolt according to another preferred embodiment, then the displacing piston has at its face side preferably a complementary shape; i.e., the radius of the screen plunger is transferred as a curvature radius to a depression at the face side of the displacing piston such that it can seamlessly follow and rest on the screen carrier plunger.

The filtering device can also be designed as a so-called screen wheel. In this case, a disk-shaped, rotatably supported screen carrier is supported between two housing halves with screen locations distributed across a partial circle. With this design, a flow passes through at least one screen location during production operation, while another one is in the backwash position.

The inner flow channel in the displacing piston is preferably designed such that it extends from an inlet opening, which is preferably funnel-shaped and is preferably located at the face side of the displacing piston, across a portion of the longitudinal extension of the displacing piston and is thus redirected to the side such that the inner flow channel empties at the end into a discharge opening which is located at the outer circumference of the displacing piston.

Alternatively, the in-flow into the inner fluid line can also occur from the outer circumference. For this purpose, the free end of the piston can be reduced in diameter compared to the remaining part of the displacing piston and compared to the inner diameter of the partial channel such that an annular gap is formed from which at least one radial inlet bore hole can lead into the inner fluid line.

According to another alternative, the displacing piston can have a fixed diameter in the end region according to the nominal diameter of the partial channel. At least one inlet bore hole is provided at its outer circumference and leads into the inner fluid line. A groove is placed in the wall of the partial channel at the location, where the end of the displacing piston is positioned in the production operation such that a flow is again enabled into an annular gap and from there into the inner fluid line.

For all versions described above, the discharge opening in the displacing piston is located directly opposite the mouth of the discharge channel in the partial channel during production operation. The melt arriving from the clean side of the screen location runs thus into the displacing piston in the end region, in particular directly at the face side, runs through the displacing piston and then inside the same is redirected to the side at an angle of 90° to 150° and finally runs into the discharge channel in the housing.

To initiate the backwash operation, the displacing piston is initially moved in the direction that is prevailing during the production operation, wherein it may also protrude with its rear end in part from the opening of the partial channel depending on the size of the housing. During this movement, the wall of the displacing piston covers the mouth of the discharge channel in the housing. Thus, the fluid flow is interrupted and the other screen locations are consequently not affected by the backwash.

A pressure generating unit such as an extruder or a melt pump acting upon the dirt side of the filtering device according to the invention effects the filling of the partial channel, which now serves as a reservoir. The displacing piston can be retracted to the point where its outer circumference barely covers the mouth of the discharge channel. This procedure can be compared to the drawing of a syringe.

The screen carrier is then moved into the rinse position. The displacing piston is then pressed into the partial channel by the force of a hydraulic cylinder or of another drive device, whereby the plastic melt or another fluid filtered in the filtering device present in said partial channel is displaced and pressed counter to the typical flow direction back into the screen space.

As has already been described above, the end position of the displacing piston in the backwash procedure can be the same as the production position. Thus, at the moment that the displacing piston has finished the backwash it can remain in the position it has reached. The connection to the discharge channel is then open again.

Even additional fluid can be guided from behind through the feed channel and the inner flow channel of the displacing piston through the screen location in order to continue the backwash.

However, the screen carrier element can also be moved again into the production position in order to again separate the connection to the backwash channel on the dirt side of the screen space and to reset the flow direction required for the production operation.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-6c of the drawings. Identical elements in the various figures are designated with the same reference numerals.

Figure 1:
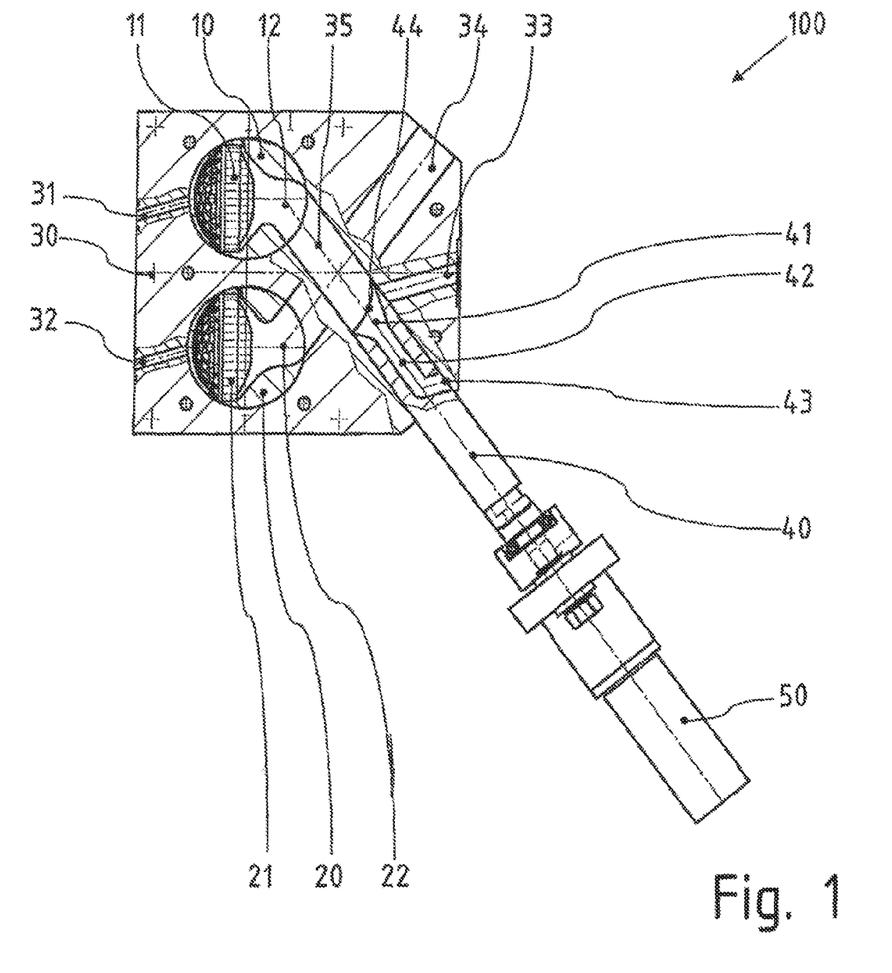
FIG. 1 depicts the filtering device of the invention with a displacing piston according to a first embodiment in an initial backwash position.

FIG. 1 shows a filtering device 100 designed as a screen piston changer, which consists essentially of:
A housing 30,
Bolt-shaped screen carrier elements 10, 20 that are supported in movable fashion in the housing bore holes,
A displacing piston 40 for each screen carrier element, and
A drive device 50 for the displacing piston 40.

Each of the screen carrier elements 10, 20 has one screen space 12, 22 which is shown in a sectional view in FIG. 1. One filter element 11, 21, each is placed therein.

Figure 2:
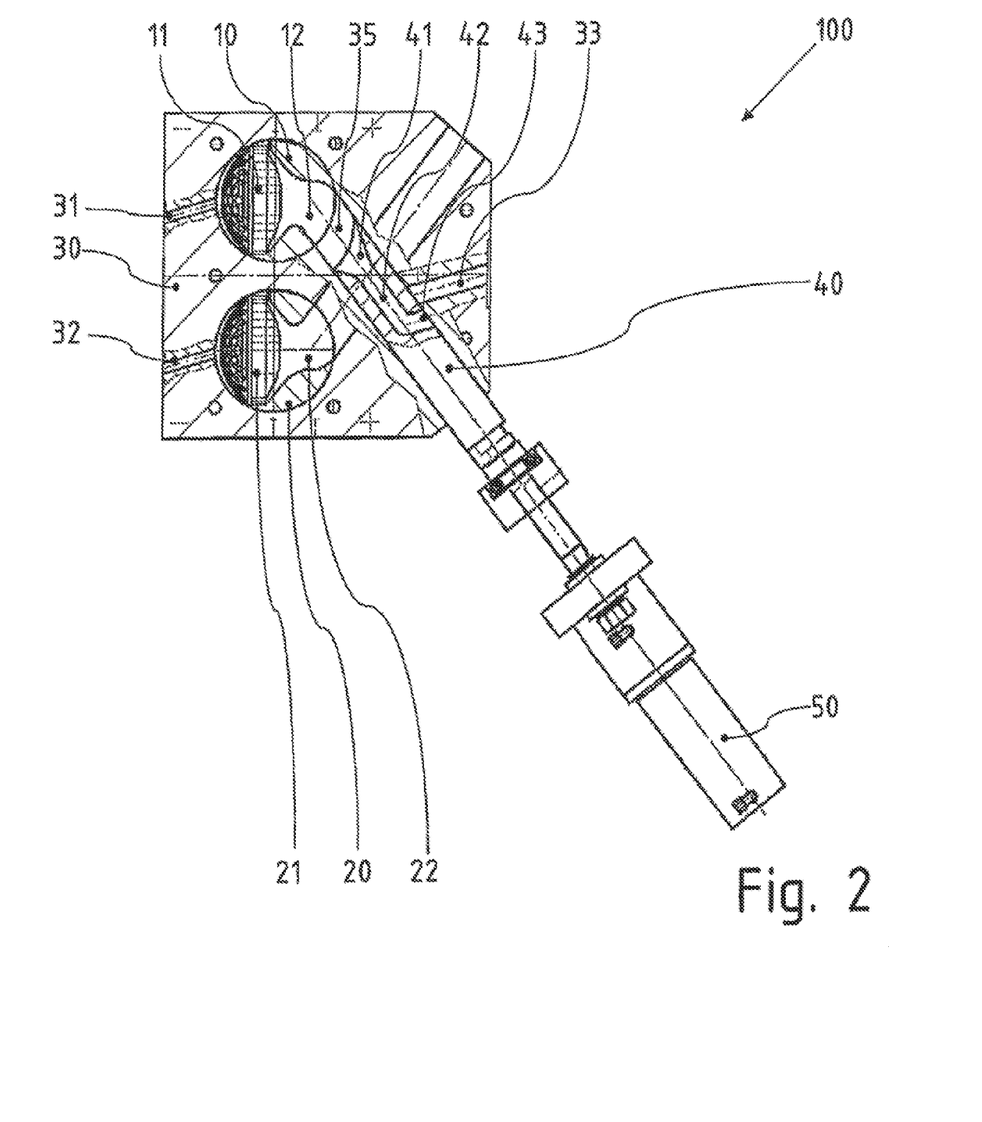
FIG. 2 shows the displacing piston in an interim backwash position.
Figure 3:
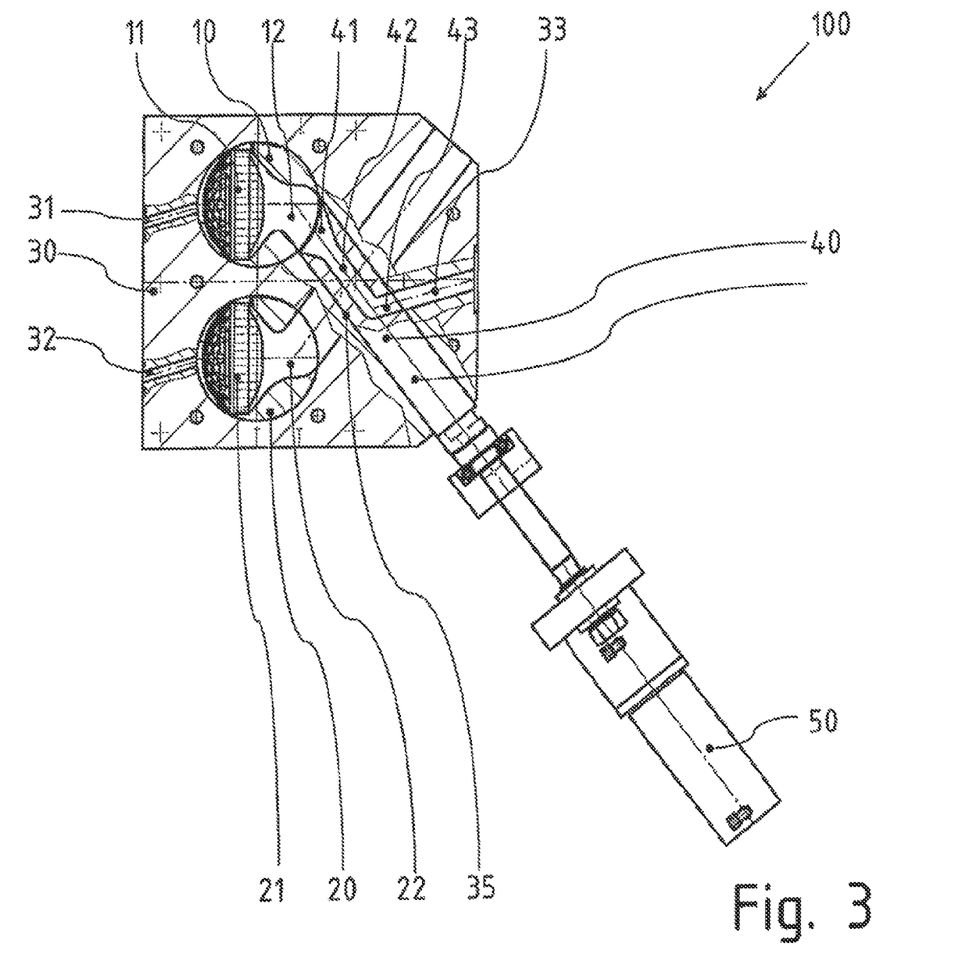
FIG. 3 shows the displacing piston in a production position.

On the dirt side—left in each of the FIGS. 1-3—are the screen spaces 12, 22 each in connection with a backwash channel 31, 32 that has been introduced into the housing 30, when the screen carrier elements 10, 20 are in the backwash position.

The sectional presentation of FIG. 1 is configured such that the partial channels 34, 35, which in the actual object are located in planes that are offset to each other, appear in one sectional plane. This view shall illustrate the position of the partial channels in relation to each other. For the sake of clarity, a displacing piston 40 with a drive device 50 is drawn only into the uppermost partial channel 35. The displacing piston, although present, is not shown for the partial channel 34 located behind.

On the clean side—right in each of the FIGS. 1-3—are the screen spaces 12, 22, each in connection with one of the partial channels 34, 35 that are introduced into the housing 30. Discharge channels 33 in turn empty into the partial channels 34, 35 and run to the outside of the housing 30 or into a central collection channel, where the flow paths join again. The discharge channel 33 visible in FIG. 1 empties into the partial channel 35 at an angle, which in the shown exemplary embodiment is about 110°.

The outer sheath of the displacing piston 40 has a continuous cylindrical design. The, in part, sectional view of the displacing piston 40 shows an inner flow path that extends from an inlet opening 41 at the face side 44 to an outlet opening 43. In the position of the displacing piston 40 according to FIG. 1, the outer sheath of the displacing piston 40 is located upstream of the discharge channel 33 and fully blocks said discharge channel.

The position shown in FIG. 1 corresponds to the backwash starting position. The amount of fluid such as a plastic melt collected in the free partial channel 33 can be used for the backwash in the subsequent stroke of the displacing piston 40.

FIG. 2 shows a position of the displacing piston 40, where it has been inserted further into the partial channel 35, however, without yet being directly adjacent to the screen space 12. The inner flow path 42 in the displacing piston 40 has now been blocked such that the outlet opening 43 is covered by the inner wall of the partial channel 35. At the same time, the mouth of the discharge channel 33 into the partial channel 35 is interrupted. Thus, the displacing piston 40 can press the fluid amount present in the partial channel 35 completely out of the partial channel 35 into the screen space 12. However, no fluid can escape in the other direction.

Finally, FIG. 3 shows the displacing piston 40 in its end position, which in the shown preferred embodiment of a filtering device 100 according to the invention corresponds to the position during production operation.

The face side 44 of the displacing piston 40 is designed with a curvature in order to follow the cylinder-bolt-shaped screen carrier element 10. In this position, the partial channel 35 is not flooded directly. There is no free volume of the partial channel 35 during the production operation; i.e., also no areas where the inner wall of the partial channel 35 would be exposed and unprotected during the production operation. Rather, the fluid emerging from the screen space 12 goes directly through the funnel-shaped inlet opening 41 into the inner flow channel 42 and all the way to the outlet opening 43 and then into the seamlessly following discharge channel 33.

The partial channels 34, 35 and thus the displacing pistons 40, which are guided therein, are oriented at an angle of 30° to 45° relative to a vertical axis through the housing 30 in the embodiments shown. With a rectangular housing cross-section, the angled arrangement utilizes the floor space to its maximum and enables a longer stroke with the same structural size. On the other hand, with a given stroke of the displacing piston 40, a smaller structural sire can be achieved when compared to a horizontally oriented partial channel.

The discharge channel 33 is again oriented at an angle in the housing 30 such that a redirection by an angle greater than 90° is achieved between the longitudinal axis of the displacing piston 40 and thus between both the longitudinal axis of the partial channel 35 and the inner flow channel 42. This minimizes the flow resistance at the location of redirection.

Figure 4:
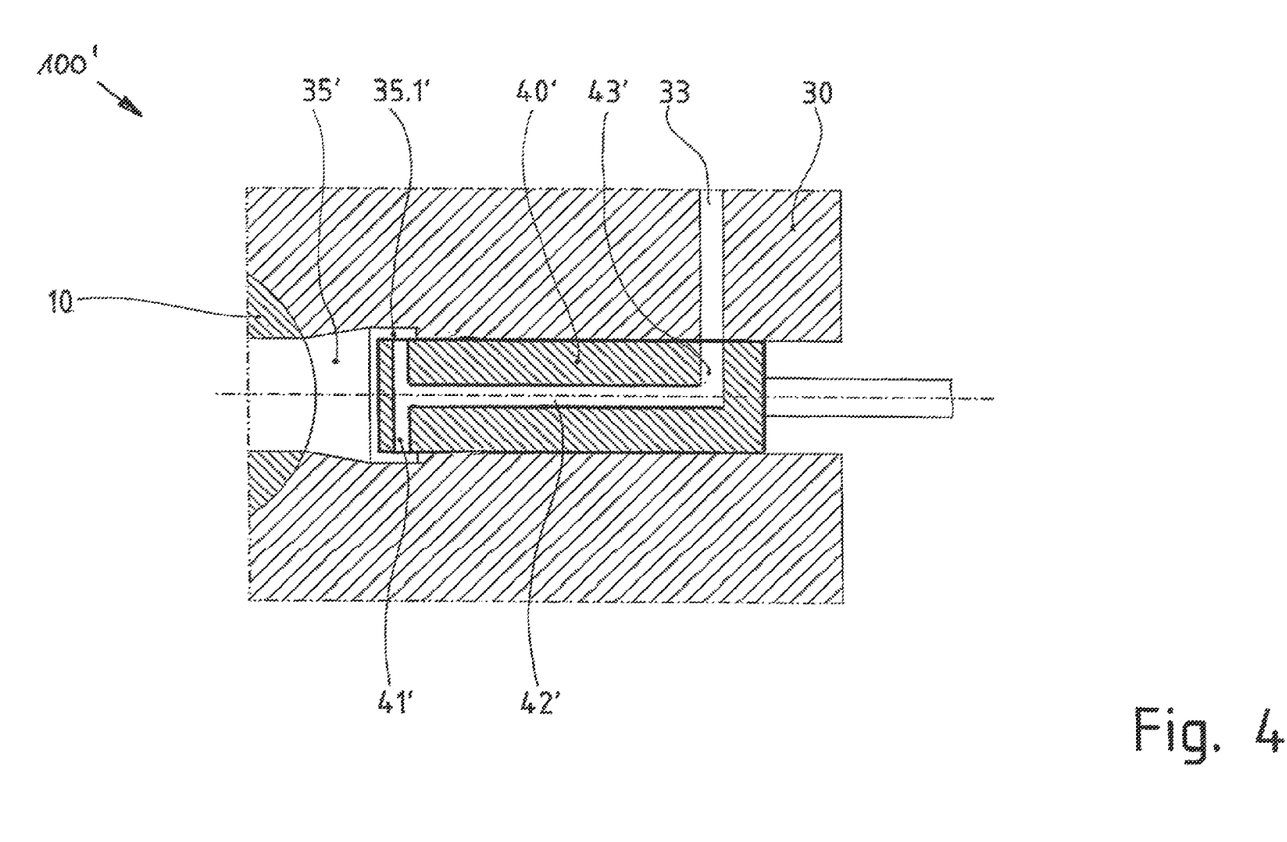
FIG. 4 shows a displacing piston according to a second embodiment.
Figure 5:
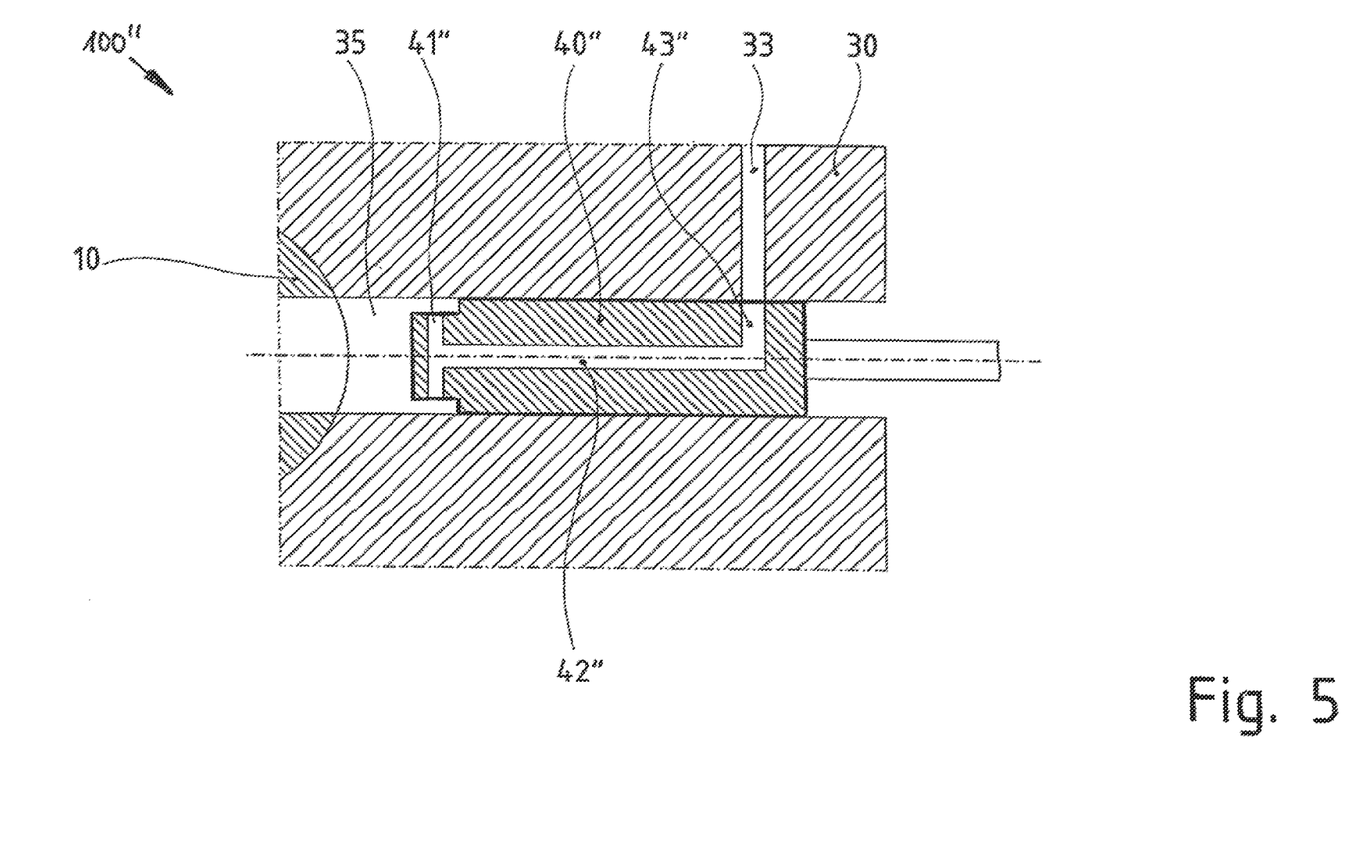
FIG. 5 shows a displacing piston according to a third embodiment.

FIGS. 4 and 5 show alternative designs of inlet openings at displacing pistons in schematic sectional views.

With the filtering device 100' embodiment of FIG. 4, a different type of partial channel 35' is provided in the housing 30. This one does not have a continuous cylindrical wall best rather a sectional expansion of the inner diameter in the form of a groove 35.1'. The groove 35.1' surrounds an inlet area at the displacing piston 40' that includes several radial inlet openings 41'. An inner fluid line 42' runs from the inlet opening 41' to the outlet opening 43' which empties prior to the discharge channel 33 in the housing 30. The displacing piston 40' itself has a cylindrical shape with a uniform diameter in the area between the inlet and outlet openings 41', 43'.

At the filtering device 100" embodiment according to FIG. 5, several radial inlet openings 41' are provided at a displacing piston 40" as well. They again empty at the outer circumference of the displacing piston 40", however in an end section with a reduced diameter such that again an annular gap is formed between the inner wall of the partial channel and the area with the inlet opening 41" in the same manner as in the embodiment according to FIG. 4. An inner fluid line 42" runs from the inlet opening 41" to the outlet opening 43" which empties prior to the discharge channel 33 in the housing 30.

Figure 6A:
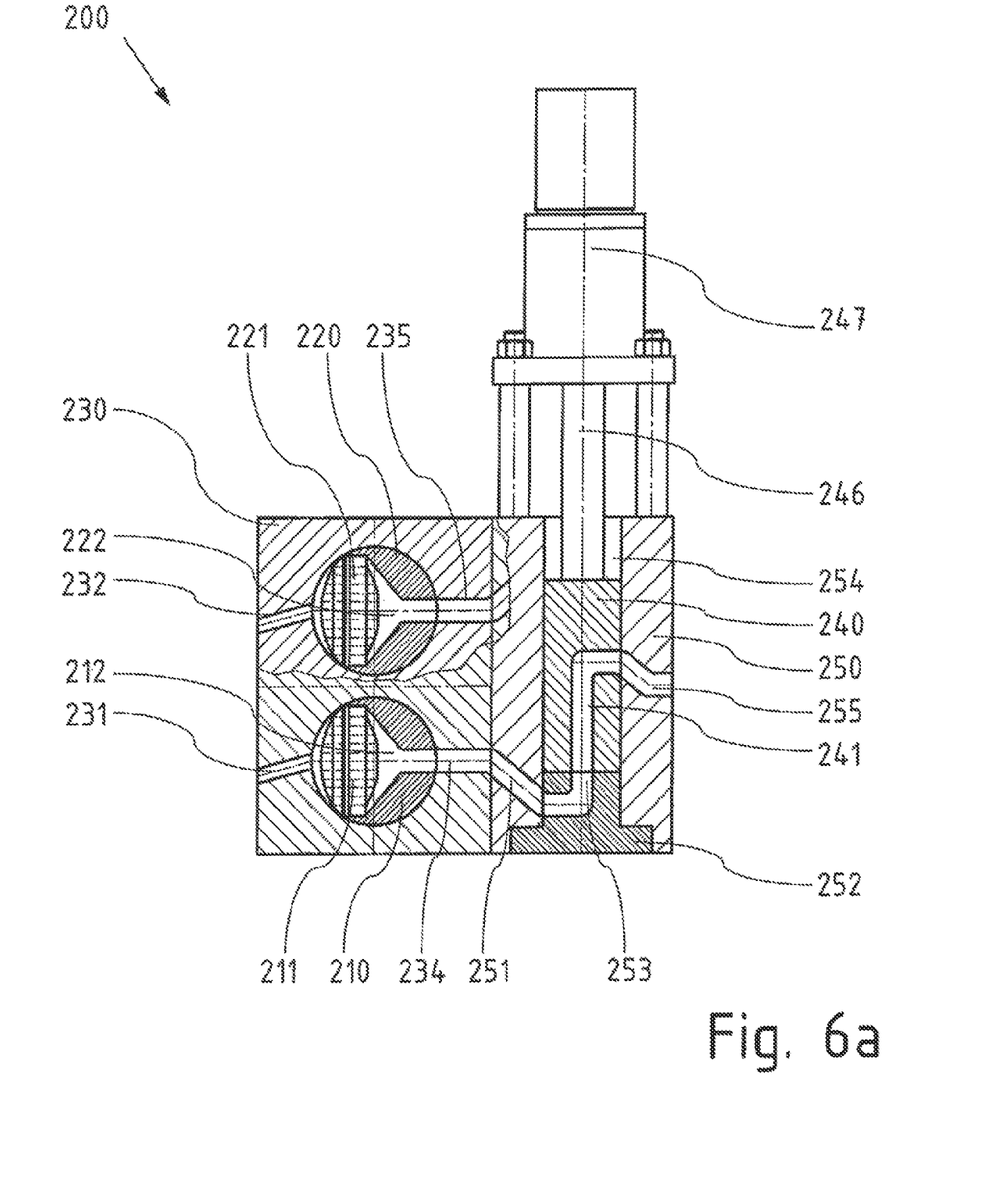
FIGS. 6a-6c show a filtering device of the invention with a displacing piston according to a fourth embodiment.
Figure 6B:
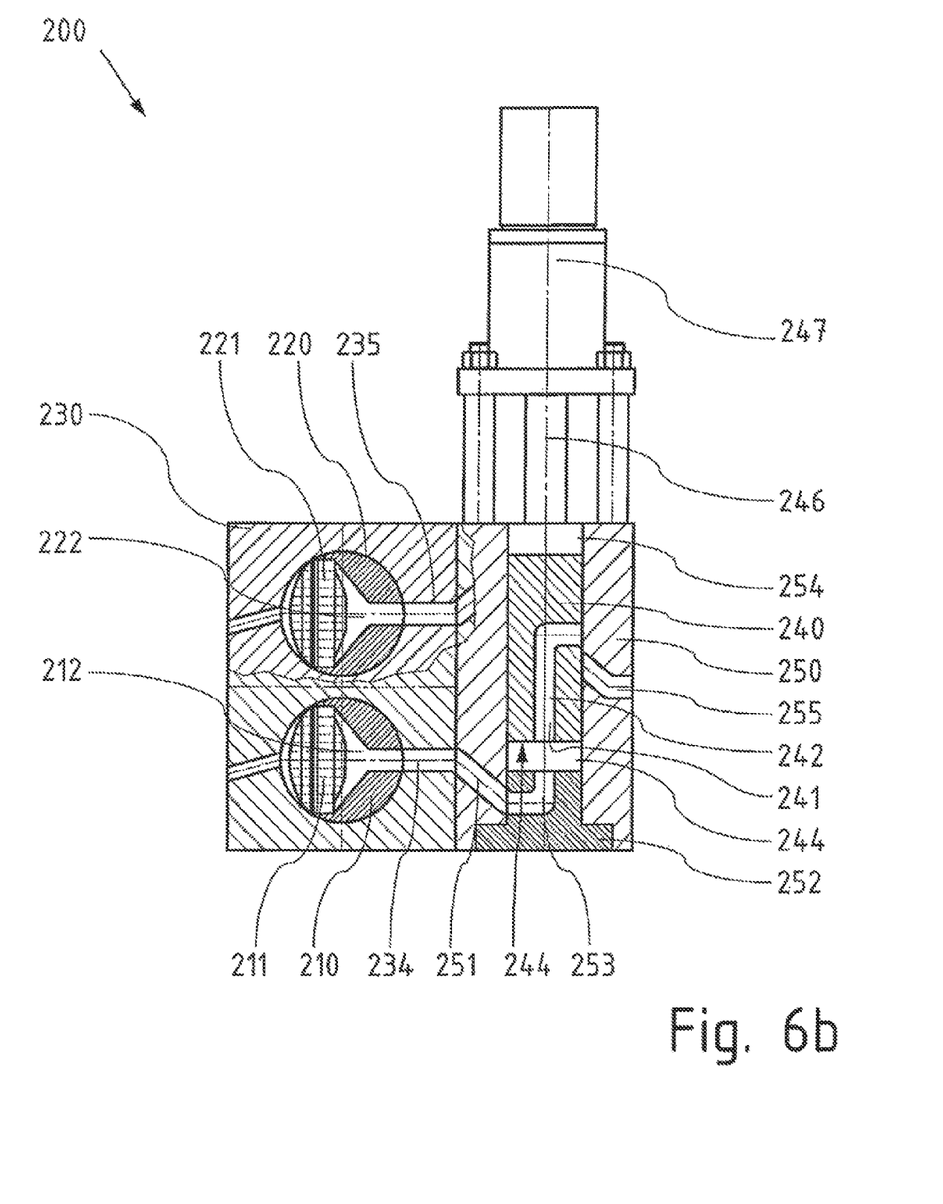
Figure 6C:
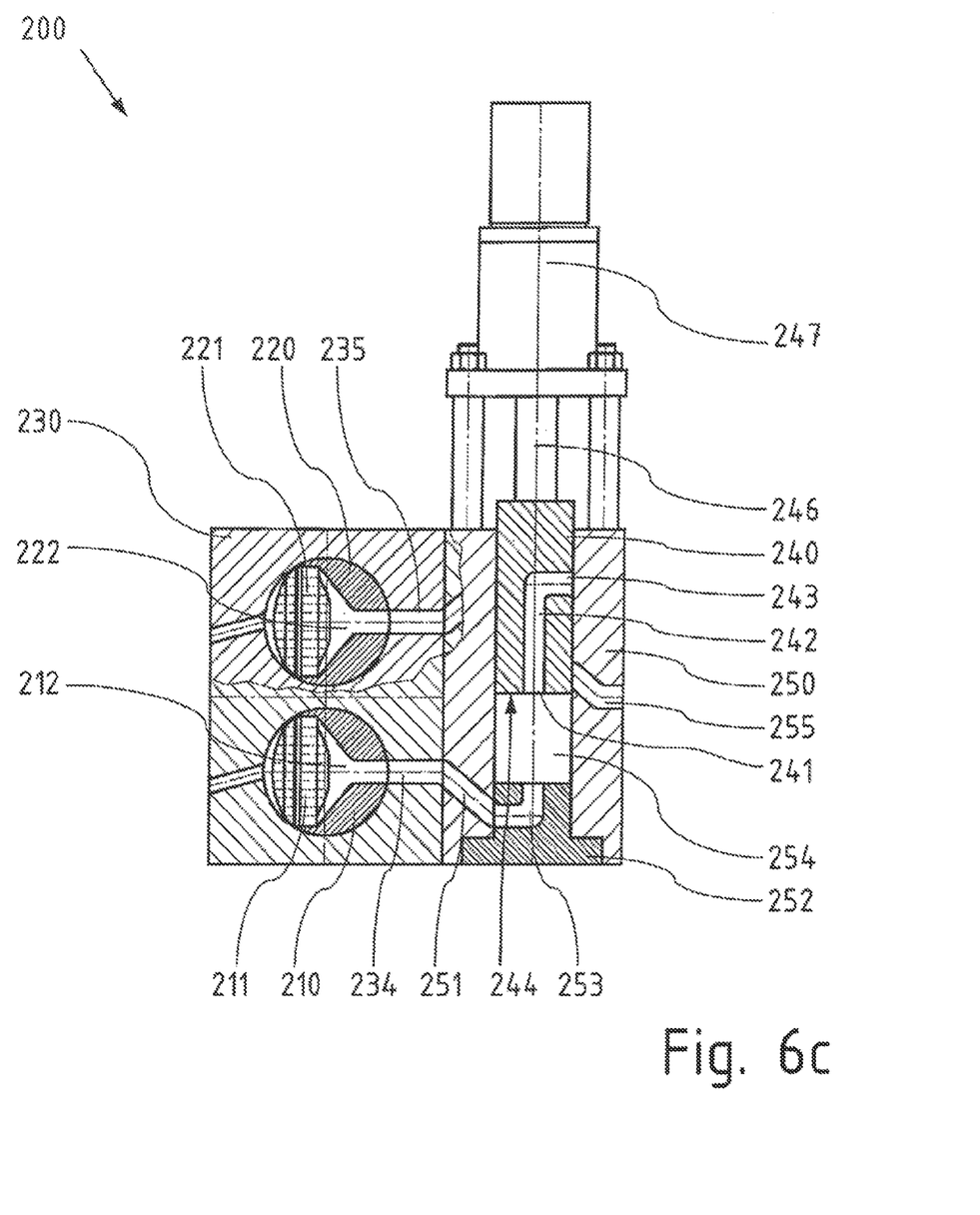

In the embodiment of a filtering device 200 shown in FIGS. 6a-6c, an additional housing 250 is provided, which is either, as shown, designed as a separate element placed at a usual housing 230, or formed in one piece together with housing 230 in one block.

Two movably supported screen carrier elements 10, 20 are arranged in housing bore holes in the housing 230, where each of said screen carrier elements posses at least one screen space 212, 222. One filter element 211, 221, each is placed therein.

On the dirt side—left in each of the FIGS. 6a-6c—are the screen spaces 212, 222 each in connection with a backwash channel 231, 232 that has been introduced into the housing 230, when the screen carrier elements 210, 220 are in the backwash position.

On the clean side—right in each of the named figures—are the screen spaces 212, 222, each in connection with one of the partial channels 234, 235 that are introduced into the housing 230.

With the filtering device 200, the partial channels 234 continue into the additional housing 250. Another section 251 of the partial channel is formed as an inlet in the additional housing 250 and transitions into a blocking element 252 and continues in its inner flow channel 253. A continuous bore hole is formed from top to bottom in the additional housing as a fluid reservoir 254 and is easy to manufacture. It is closed at the bottom by the solidly inserted blocking element, which can be removed for cleaning purposes and at the top by the displacing piston 240, which can be raised and lowered via a piston rod 246 by a drive unit 247.

The production operation occurs in the position according to FIG. 6 a. The fluid flows from the screen space 212 through the partial sections 234, 251, 253 of the partial channel. The displacing piston 240 is moved directly to the blocking element 252 such that no gap with an expanded diameter of the bore hole 254 remains open. Rather, the partial channel 253 goes from its outlet from the blocking element 252 directly and without offset or diameter jump into an inlet opening at the face side of the displacing piston 240. From there it goes through the inner flow channel 241 and exits at the circumference of the displacing piston 240, where it transitions into a discharge channel 255.

In FIG. 6b, the retraction movement of the displacing piston 240 starts in order to prepare for a backwash. When the face side 244 of the displacing piston 240 lifts off the face side of the blocking element 252, a part of the bore hole, which serves as fluid reservoir 254 with its significantly larger diameter compared to the partial channel used only in the production operation, is exposed.

As shown also in FIG. 6c, drawing up the displacing piston 240 not only enlarges the fluid reservoir 254 significantly but at the same time places the sheath surface of the displacing piston 240 in front of the discharge channel, thus sealing it. Furthermore, the inner flow channel 242 is sealed at the displacing piston 240 at its outlet opening through the sheath surface of the bore hole 254.

For backwashing the filter medium 211 in the screen space 212, the displacing piston 240 travels again into its starting position according to FIG. 6a. In doing so, it presses the fluid that is temporarily stored in the fluid reservoir 254 completely through the partial channel 253, 251, 234 back into the screen space, from where the fluid can flow to the outside through the backwash channels 231, 232. The face side 244 of the displacing piston is again placed flat onto the upper face surface of the blocking element 252. The flow channel with a narrow cross-section is thus again opened for production operation, while the fluid reservoir 254 on the other hand is filled fully by the displacing piston 240, such that no fluid residue can remain there.

There has thus been shown and described a novel filtering device for high-viscosity fluids, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A filtering device for viscous fluids, said filtering device comprising:
   a housing;
   a screen carrier element movably supported in said housing, said screen carrier element having a screen space;
   a filter element disposed in said screen space, said screen space and said filter element each having a dirty side and a clean side;
   a backwash channel in said housing, said backwash channel connected to said dirty side of said screen space;
   a partial channel in said housing, said partial channel having a linear partial section and an inner wall with an inner diameter;
   a discharge channel in said housing, said discharge channel having a discharge channel inlet and a discharge channel outlet, said partial channel configured to fluidly connect said clean side of said screen space to said discharge channel, said discharge channel branching off and extending away from said linear partial section at said discharge channel inlet; and
   a displacing piston disposed in said partial channel for movement between a production position and a backwash starting position, said displacing piston having a circumference defined by an outer wall with an outer diameter, said displacing piston having an inlet opening, an inner fluid line, and an outlet opening, said inner fluid line extending from said inlet opening to said outlet opening, said outlet opening located at said circumference of said displacing piston, said outer diameter of said displacing piston corresponding, at least in some regions, to said inner diameter of said partial channel,
   said displacing piston configured to move counter to a production fluid flow direction to press fluid located in said partial channel through said filter element and into said backwash channel, thereby moving such fluid counter to the production fluid flow direction,
   said displacing piston, when in said production position, has its outlet opening in fluid communication with said discharge channel inlet, and
   said displacing piston configured to move along a backwash travel path into a backwash starting position to accumulate fluid inside said partial channel, and when said displacing piston is in said backwash starting position said discharge channel inlet is covered by said outer wall of said displacing piston or said outlet opening of said displacing piston is covered by said inner wall of said partial channel.

2. The filtering device of claim 1, wherein said displacing piston has a face side, and said displacing piston is not moveable counter to the production fluid flow direction beyond its location when in said production position.

3. The filtering device of claim 1, wherein said inlet opening of said displacing piston is located at said circumference of said displacing piston.

4. The filtering device of claim 1, wherein said displacing piston has a face side, and said inlet opening of said displacing piston is located at said face side of said displacing piston.

5. The filtering device of claim 1, wherein said inlet opening is located at an end section of said displacing piston, and said outlet opening is located at a center section of said displacing piston, said displacing piston comprising a single continuous cylindrical wall that forms both said end section and said center section of said displacing piston.

6. The filtering device of claim 1, wherein said housing has a bore hole, said screen carrier element has a cylindrical shape, and said screen carrier element is movably disposed in said bore hole of said housing.

7. The filtering device of claim 1, wherein said screen carrier element includes a second screen space.

8. The filtering device of claim 1, further comprising a second screen carrier element, a second displacing piston, and a second partial channel, said second screen carrier element being movably supported in said housing, said second displacing piston disposed in said second partial channel for movement between a production position and a backwash starting position.

9. The filtering device of claim 6, wherein said displacing piston has a face side with a curvature that matches a radius of said cylindrical shape of said screen carrier element.

10. The filtering device of claim 1, wherein said screen carrier element is a screen wheel that is rotatably supported in said housing and that has multiple screen spaces arranged on a partial circle.

11. The filtering device of claim 1, wherein said discharge channel extends along an axis that forms an angle α in the range of 120° to 150° with an axis along which said partial channel extends.

12. The filtering device of claim 1, wherein said housing has a vertical housing axis, and said partial channel extends along an axis that is offset at an angle in the range of 30° to 60° from said vertical housing axis.

13. A filtering device for viscous fluids, said filtering device comprising:
- a housing;
- a screen carrier element movably supported in said housing, said screen carrier element having a screen space;
- a filter element disposed in said screen space, said screen space and said filter element each having a dirty side and a clean side;
- a backwash channel in said housing, said backwash channel connected to said dirty side of said screen space;
- an additional housing;
- a fluid reservoir in said additional housing, said fluid reservoir having a linear partial section;
- a partial channel in said housing, said partial channel extending from a first end to a second end, said first end connected to said clean side of said screen space and said second end connected to said additional housing;
- a discharge channel in said additional housing and having a discharge channel inlet and a discharge channel outlet, said discharge channel inlet connected to said fluid reservoir, said discharge channel branches off and extends away from said fluid reservoir, said discharge channel outlet configured to discharge flow from said housing; and
- a displacing piston disposed in said fluid reservoir for movement between a production position and a backwash starting position, said displacing piston having a circumference defined by an outer wall with an outer diameter, said displacing piston having an inlet opening, an inner fluid line, and an outlet opening, said inner fluid line extending from said inlet opening to said outlet opening, said outlet opening located at said circumference of said displacing piston, said outer diameter of said displacing piston corresponding, at least in some regions, to said inner diameter of said fluid reservoir,
- said displacing piston configured to move counter to a production fluid flow direction to press fluid located in said fluid reservoir through said filter element and into said backwash channel, thereby moving such fluid counter to the production fluid flow direction,
- said displacing piston, when in said production position, has its outlet opening in fluid communication with said discharge channel inlet, and
- said displacing piston configured to move along a backwash travel path into a backwash starting position to accumulate fluid inside said fluid reservoir, and when said displacing piston is in said backwash starting position said discharge channel inlet is covered by said outer wall of said displacing piston or said outlet opening of said displacing piston is covered by said inner wall of said fluid reservoir.

14. The filtering device of claim 13 wherein said partial channel in said housing opens to an inlet of a section of partial channel in said additional housing.

15. The filtering device of claim 14, further comprising a blocking element that closes one end of said fluid reservoir, a redirection channel, said section of partial channel in said additional housing opening to said redirection channel in said blocking element.

16. The filtering device of claim 15, wherein said redirection channel in said blocking element opens to said fluid reservoir at said face of said blocking element.

17. The filtering device of claim 15, wherein said displacing piston, when in said production position, is positioned such that no gap exists between a face side of said displacing piston and a face surface of said blocking element, and wherein when said displacing piston is in said backwash starting position a gap is formed between said face side of said displacing piston and said face surface of said blocking element.

18. The filtering device of claim 13, wherein said housing and said additional housing are formed by a single block.

\* \* \* \* \*